(12) United States Patent
Nicewick et al.

(10) Patent No.: US 11,710,385 B2
(45) Date of Patent: Jul. 25, 2023

(54) POINT OF SALE SYSTEM WITH HINGE STRUCTURE FOR MULTIPLE POSITIONS

(71) Applicant: Oracle International Corporation, Redwood Shores, CA (US)

(72) Inventors: John H. Nicewick, Chicago, IL (US); Paul Schleicher, Ellicott City, MD (US); Denise Ann Spears, Fort Mitchell, KY (US); Jack Godfrey Wood, San Francisco, CA (US); Robert Nicholas Dean, Seattle, WA (US); Gabriela Ravassa, Los Angeles, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/448,268

(22) Filed: Sep. 21, 2021

(65) Prior Publication Data
US 2023/0092141 A1    Mar. 23, 2023

(51) Int. Cl.
*G07G 1/00*        (2006.01)

(52) U.S. Cl.
CPC ................................. *G07G 1/0018* (2013.01)

(58) Field of Classification Search
CPC ...................................................... G07G 1/0018
USPC ......................................................... 235/383
See application file for complete search history.

(56) References Cited

U.S. PATENT DOCUMENTS

| | | | |
|---|---|---|---|
| 9,913,550 B2 | 3/2018 | Law et al. | |
| 2014/0197298 A1* | 7/2014 | Chen | F16M 11/10 248/558 |
| 2016/0051067 A1* | 2/2016 | Law | F16M 11/2021 361/679.22 |
| 2016/0120050 A1* | 4/2016 | Chen | F16M 13/00 361/679.01 |
| 2018/0060851 A1* | 3/2018 | Govindarajan | G07G 1/12 |

FOREIGN PATENT DOCUMENTS

EP        0887724 A1    12/1998

* cited by examiner

*Primary Examiner* — Suezu Ellis
(74) *Attorney, Agent, or Firm* — Potomac Law Group, PLLC

(57) ABSTRACT

Embodiments include a point of sale system. The point of sale system includes a base, a stand coupled to the base, and a head unit coupled to the stand. The point of sale system further includes two outer hinge arms and an inner hinge arm that couple the head unit to the stand.

20 Claims, 11 Drawing Sheets

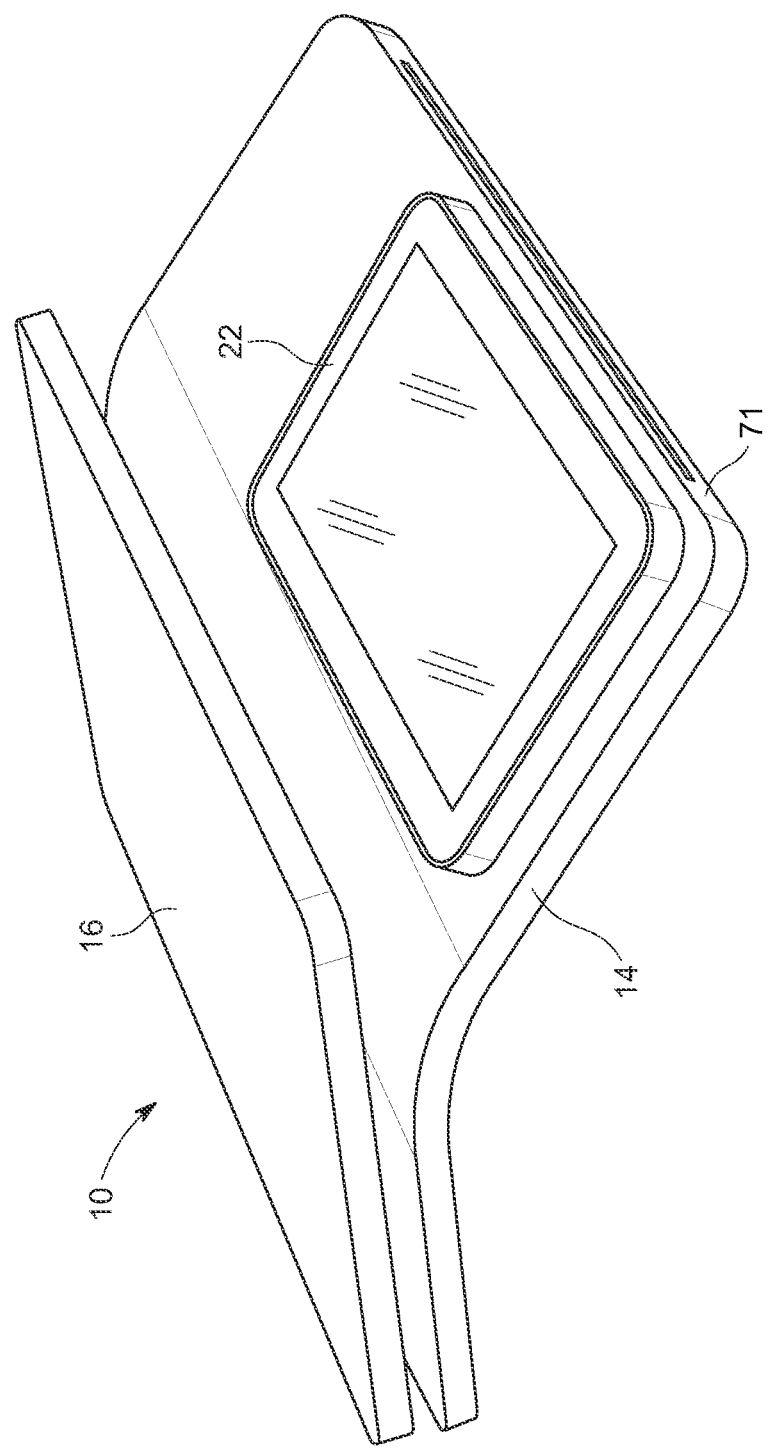

POINT OF SALE SYSTEM WITH HINGE STRUCTURE FOR MULTIPLE POSITIONS

FIELD

One embodiment is directed generally to a point of sale system, and in particular to a multi-position point of sale system.

BACKGROUND INFORMATION

A point of sale ("POS") or point of purchase ("POP") is the time and place where a retail transaction is completed. At the POS, a merchant/retailer can calculate the amount owed by the customer, indicate that amount, prepare an invoice for the customer (which may be a printout), and indicate the options for the customer to make payment. It is also the point at which a customer makes a payment to the merchant in exchange for goods or after provision of a service. After receiving payment, the merchant may issue a receipt for the transaction, which is usually printed but can also be dispensed with or sent electronically. At the POS, there is typically a POS system to facilitate this functionality.

POS systems, in particular, have drastically changed the food and beverage industry. Modern POS systems have transformed the old cash register into computers, most commonly with touchscreens. These POS systems connect to a hosted "cloud" service, or to an on premise server, or can operate in a stand-alone mode. POS systems can be configured for employees to enter customer orders, or for customers to enter their orders in a kiosk mode, or can be reconfigured dynamically for either use case or a hybrid of both.

Typical restaurant POS software is able to create and print guest checks, print orders to kitchens and bars for preparation, process credit cards and other payment cards, and run reports. In addition, some systems implement wireless pagers and electronic signature-capture devices.

In the fast food industry, displays may be at the front counter, or configured for drive-through or walk-through cashiering and order taking. Front counter registers allow taking and serving orders at the same terminal, while drive-through registers allow orders to be taken at one or more drive-through windows to be cashiered and served at another. In addition to registers, drive-through and kitchen displays are used to view orders. Once orders appear they may be deleted or recalled by the touch interface or by bump bars. Drive-through systems are often enhanced by the use of drive-through wireless (or headset) intercoms. The efficiency of such systems has decreased service times and increased efficiency of orders.

Another innovation in technology for the restaurant or other retail industry is the wireless POS. Many restaurants with high volume use a wireless handheld POS to collect orders which are sent to a server. The server sends required information to the kitchen in real time. Wireless systems can include drive-through microphones and speakers, which are wired to a "base station" or "center module." This, in turn, will broadcast to headsets. Headsets may be an all-in-one headset or one connected to a belt pack.

Tablet POS systems popular for retail solutions are becoming prevalent in the restaurant industry. Tablet systems today are being used in all types of restaurants including table service operations. Most tablet systems upload all information to the Internet so managers and owners can view reports from anywhere with a password and Internet connection. Smartphone Internet access has made alerts and reports from the POS very accessible. Tablets have helped create the mobile POS system, and mobile POS applications also include payments, loyalty, online ordering, table side ordering by staff and table top ordering by customers. Regarding the payments, a mobile POS can accept all kinds of payment methods from contactless cards, EMV chip-enabled cards, and mobile NFC enabled cards.

With the proliferation of low-priced touchscreen tablet computers, more and more restaurants and other retail outlets have implemented self-ordering through tablet POS placed permanently on every table. Customers can browse through the menu on the tablet and place their orders which are then sent to the kitchen. Most restaurants that have touchscreen self-order menus include photos of the dishes so guests can easily choose what they want to order.

SUMMARY

Embodiments include a point of sale system. The point of sale system includes a base, a stand coupled to the base, and a head unit coupled to the stand. The point of sale system further includes two outer hinge arms and an inner hinge arm that couple the head unit to the stand.

BRIEF DESCRIPTION OF THE DRAWINGS

FIGS. 1A, 1B and 1C illustrate the POS system in positions corresponding to the three use cases in accordance to embodiments.

DETAILED DESCRIPTION

One embodiment is Point of Sale ("POS") system or kiosk that can be deployed in various configurations to allow for increased flexibility and increased benefit. Embodiments include a novel hinge structure so that the POS system can be implemented in the following use cases: (1) An upright mode with the POS display facing the employee; (2) An upright mode with the POS display "oriented" (i.e., flipped over) towards the customer for kiosk usage or for the customers to input loyalty program information or similar information; and (3) A low profile mode, with the POS stand oriented horizontal to the counter and the POS display facing the employee. Embodiments provide a user with the ability to flip the screen over the top of the fixed stand to become a patron/customer facing kiosk.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1A:
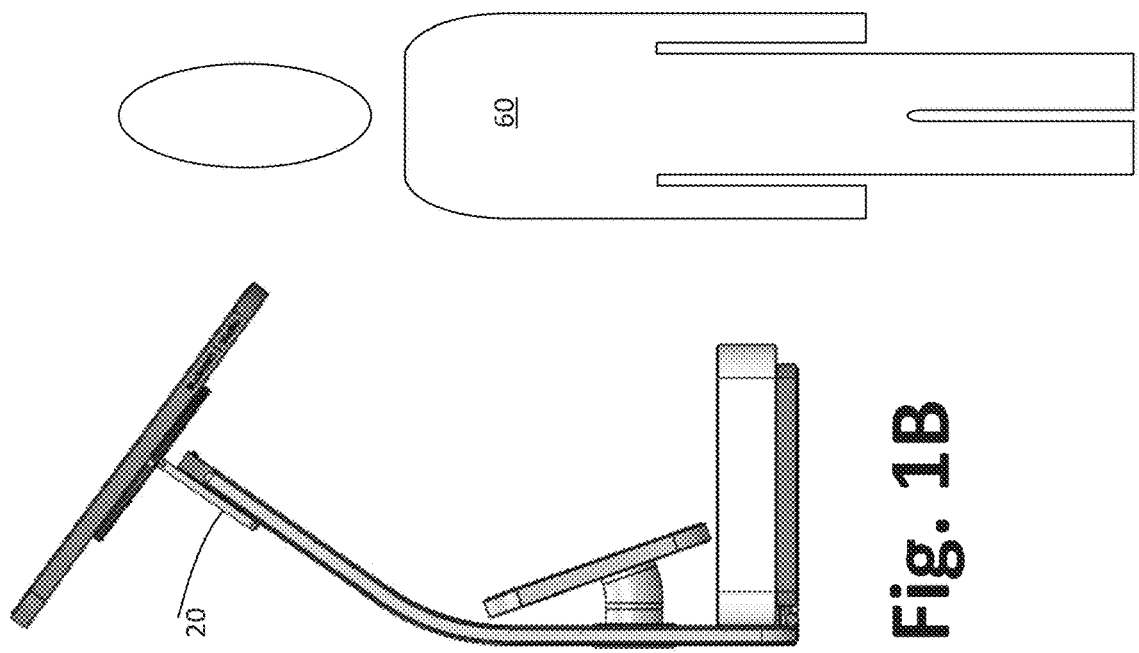
Figure 1B:
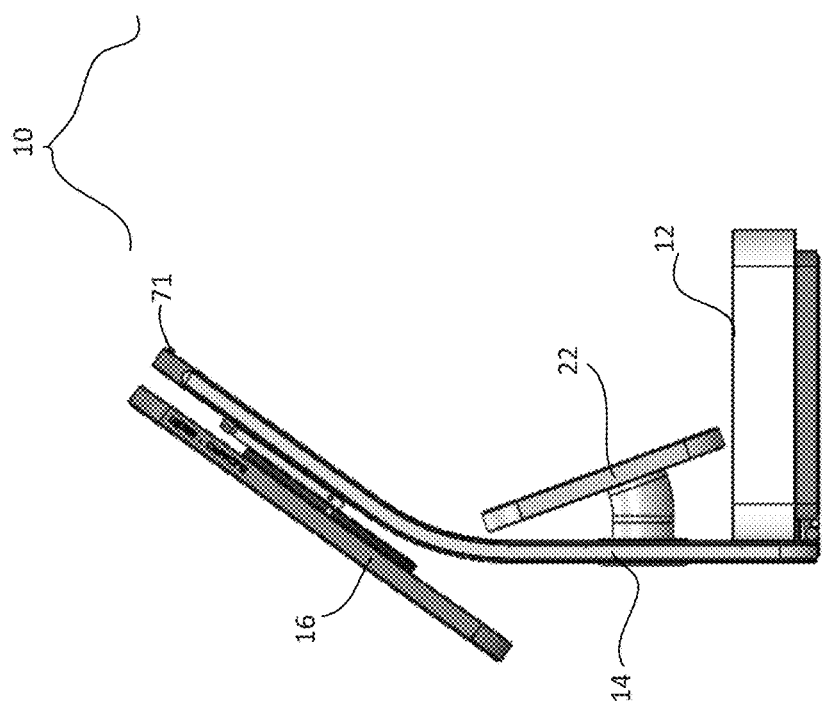

FIGS. 1A, 1B and 1C illustrate the POS system 10 in positions corresponding to the three use cases in accordance to embodiments. The two positions shown in FIGS. 1A and 1B, corresponding to use cases 1 and 2 described above, would typically be implemented in a restaurant or other retail environment where POS system 10 is on a counter between an employee 50 and a customer 60. POS system 10 includes a base 12, a stand 14, and a head unit 16. Head unit 16 includes a touchscreen or other interface, such as via a tablet, and is either attached to a bracket or integrated as a single piece. Head unit 16 is connected, wirelessly or wired, with a server or other system that implements remote functionality. Head unit 16 implements POS software, such as "Oracle MICROS Simphony Point of Sale" from Oracle Corp. In other embodiments, head unit 16 can merely be a physical device that is adapted to hold an electronic unit, such as a table computer, in a fixed position.

POS system 10 further includes a hinge assembly 20, which include multiple hinge arms, as disclosed in further detail below. POS system 10 further includes an optional secondary screen 22 which provides information and allows interaction with customer 60 during both of the positions.

FIG. 1A illustrates an upright use case where head unit 16 is at a level to be viewed by employee 50 and allow employee 50 to interact via, for example, tapping or gestures. FIG. 1B illustrates an upright use case where head unit 16 has now rotated to the other side of stand 14 so that it can be viewable by customer 60, allowing customer 60 to interact, but positioning head unit 16 at a higher level (in comparison to the position in FIG. 1A), avoiding potential conflict with or obscuring of secondary screen 22. The lower positioning of head unit 16 in FIG. 1A also ensures that employee 50 can more easily see over POS system 10 and establish a more visible contact with customer 60.

The ability for hinge assembly 20 to lower the position of head unit 16 relative to stand 14 in FIG. 1A as compared to FIG. 1B also allows for a low profile mode of operation. The low profile mode, shown in FIG. 1C, is established by removing base unit 12 and rotating stand 14 so that point 71 rests on the counter. In this use case, secondary screen 22 is mounted on the same side of stand 14 as head unit 16.

Figure 2A:
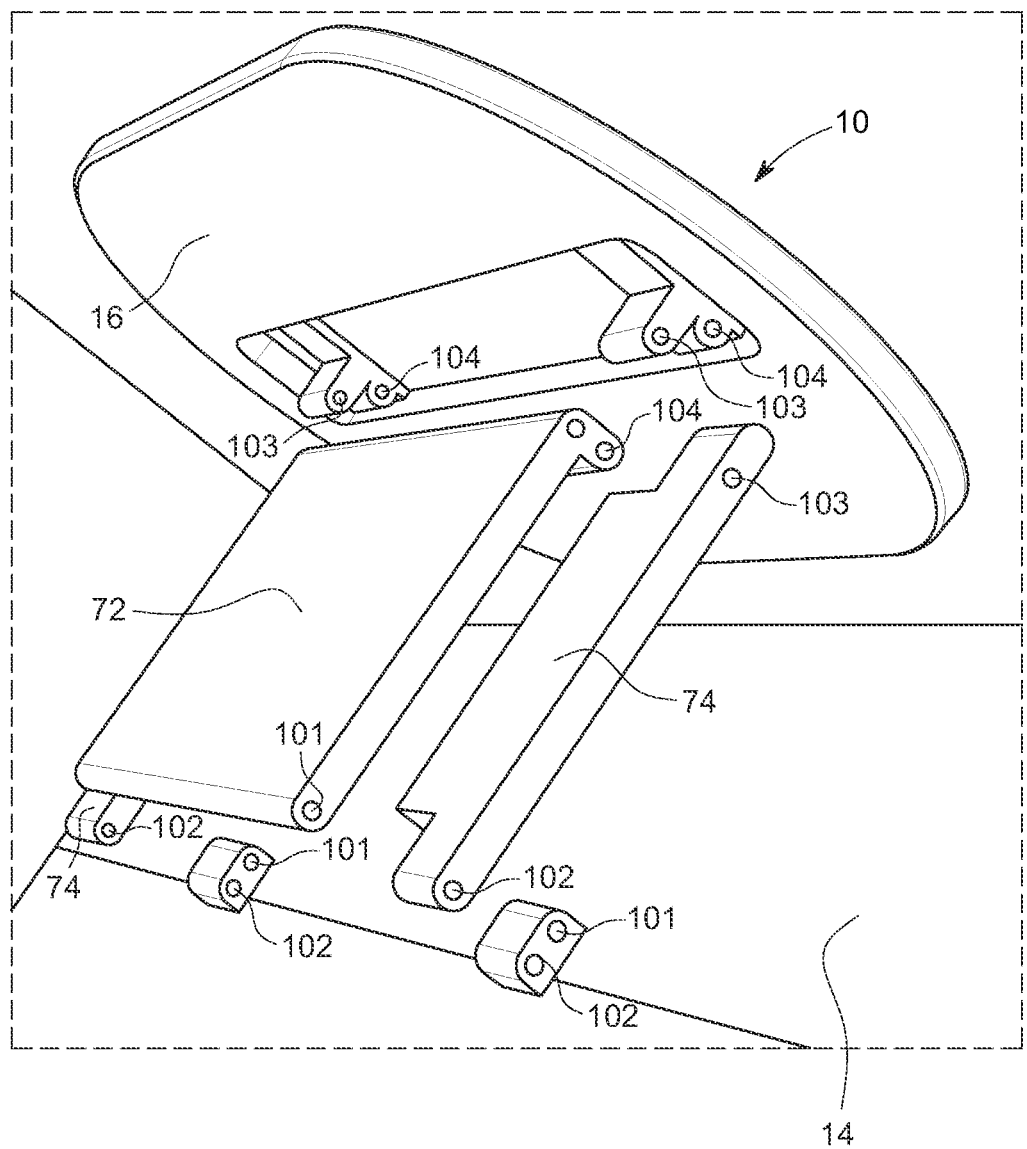
FIGS. 2A-2D illustrates additional details of the POS system in accordance to embodiments.

FIGS. 2A-2D illustrates additional details of POS system 10 in accordance to embodiments. FIG. 2A is a partial perspective view of POS system 10 in accordance to embodiments. Hinges 20 from FIG. 1B includes an inner hinge arm 72 and two outer hinge arms 74.

Inner hinge arm 72 mounts to stand 14 at pivot points 101. Inner hinge arm 72 mount to head unit 16 at pivot points 104.

Outer hinge arms 74 mount to stand 14 at pivot point 102 and mount to head unit 16 at pivot point 103.

Figure 2B:
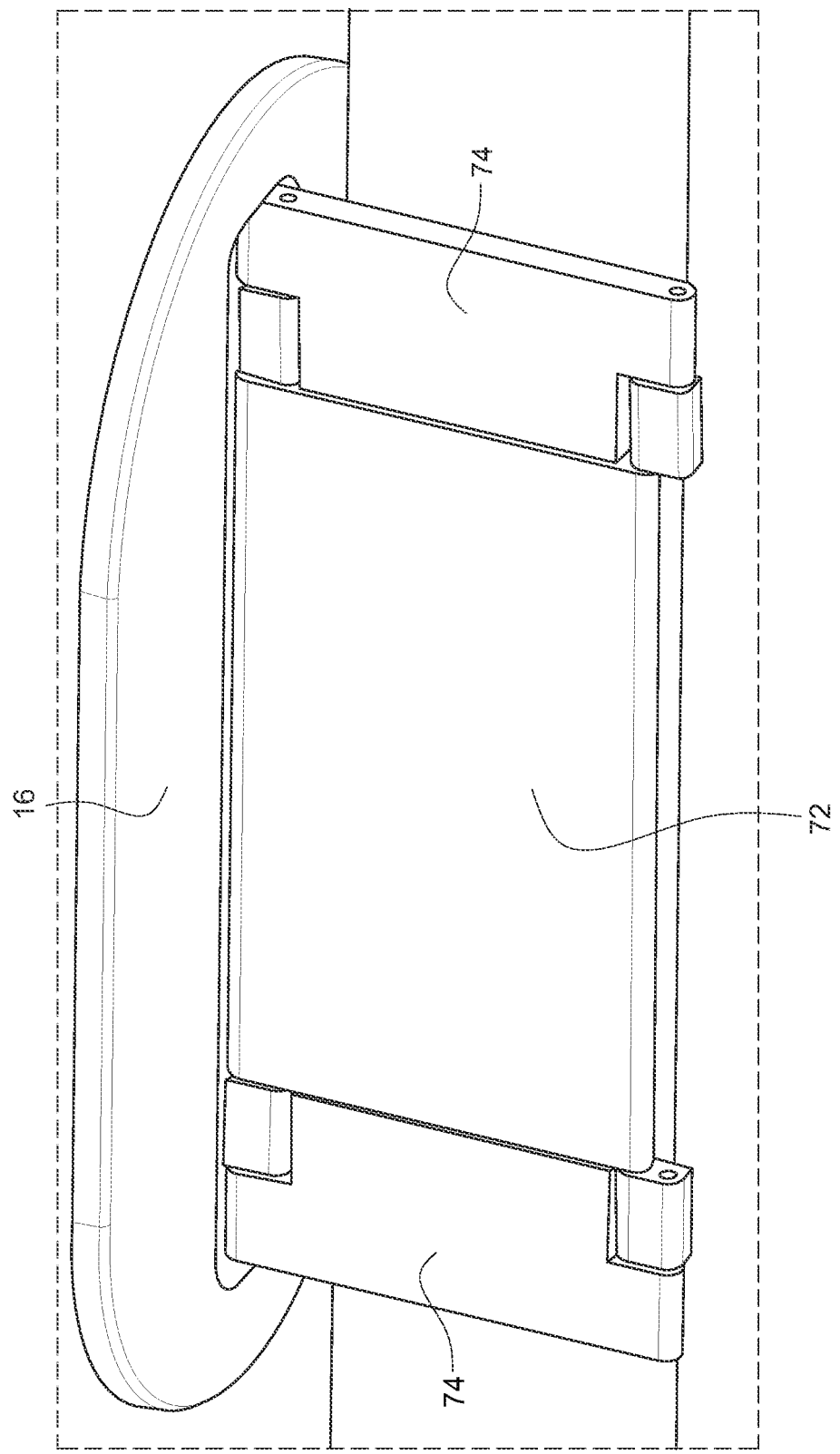

FIG. 2B is an additional view of the hinge arms of POS system 10 in accordance to embodiments.

Hinge pivot points 101 and 102 allow hinge assembly 20 to rotate through a 180 degree range of motion relative to stand 14. Hinge pivot points 103 and 104 allow head unit 16 to rotate through a 90 degree range of motion relative to hinge assembly 20.

The offset of pivot points 104 and 103 constrain the angle of head unit 16 through the full range of motion of hinge assembly 20, eliminating the potential for head unit 16 to impact stand 14 during use.

Inner hinge arm 72 forms a solid cross structure between the two outer hinge arms 74, ensuring neither end/side of head unit 16 begins movement ahead of the other, and avoiding the potential for a binding of the motion. Friction can be applied at only one or to all pivot points, allowing multiple variations of resistance, cost and longevity, based on use case criteria.

Figure 2C:
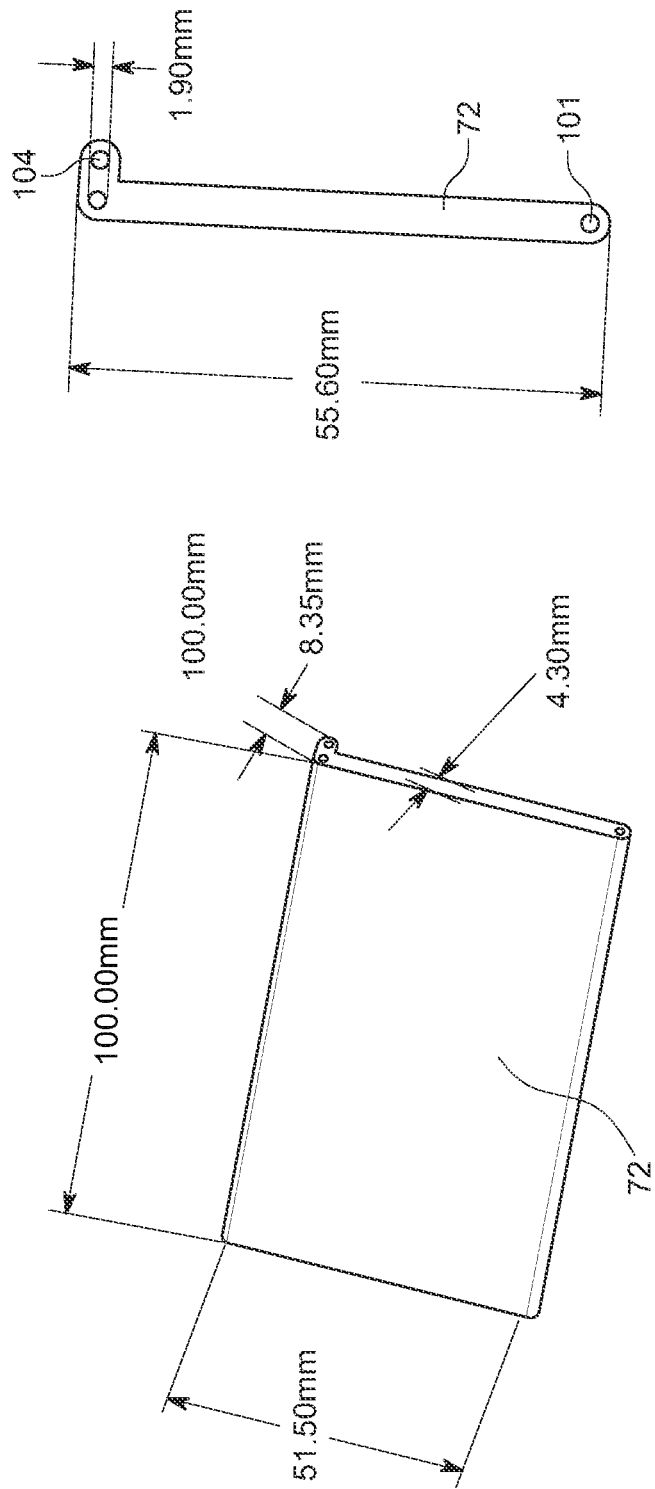

FIG. 2C is an additional view of the inner hinge arm 72 of POS system 10 in accordance to embodiments. FIG. 2C illustrates example dimensions of inner hinge arm 72 in accordance to embodiments.

Figure 2D:
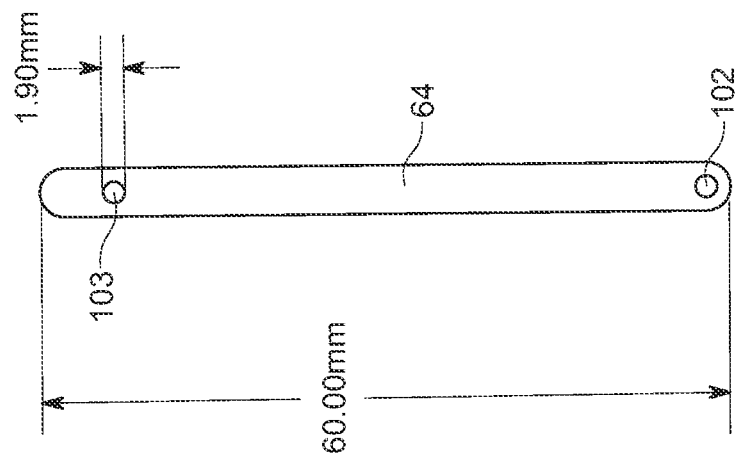
Figure 2D:
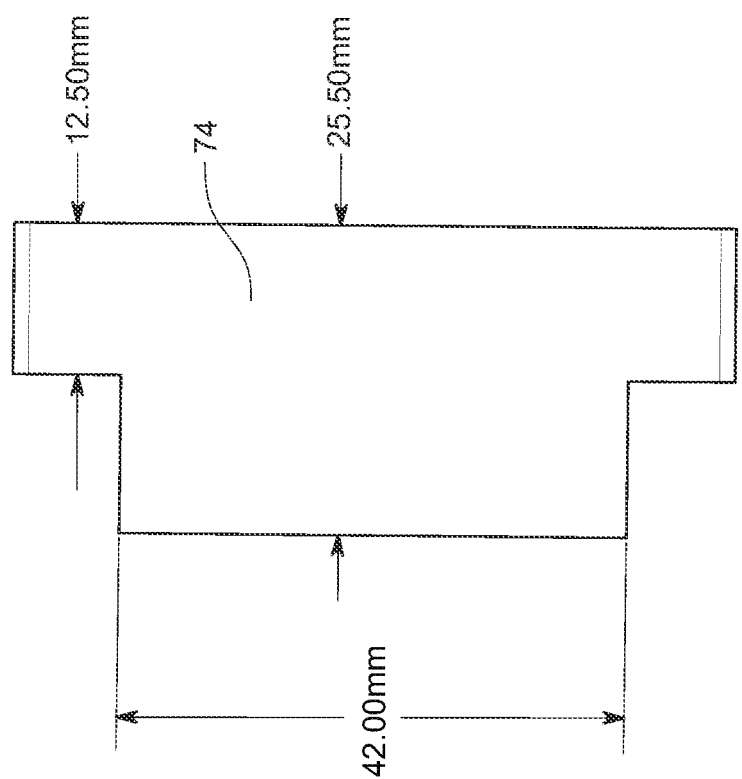

FIG. 2D is an additional view of one of the outer hinge arms 74 of POS system 10 in accordance to embodiments. FIG. 2D illustrates example dimensions of each of outer hinge arms 74 in accordance to embodiments.

FIGS. 3-6 are perspective views of POS system 10 in accordance to embodiments. In FIGS. 3-6, hinge pivot points 101 ("A"), 102 ("B"), 103 ("C") and 104 ("D") are located on the outer edges of system 10 relative to the embodiment of FIG. 2 to simplify the viewing of hinge mechanism 20 throughout the range of motion.

Figure 3:
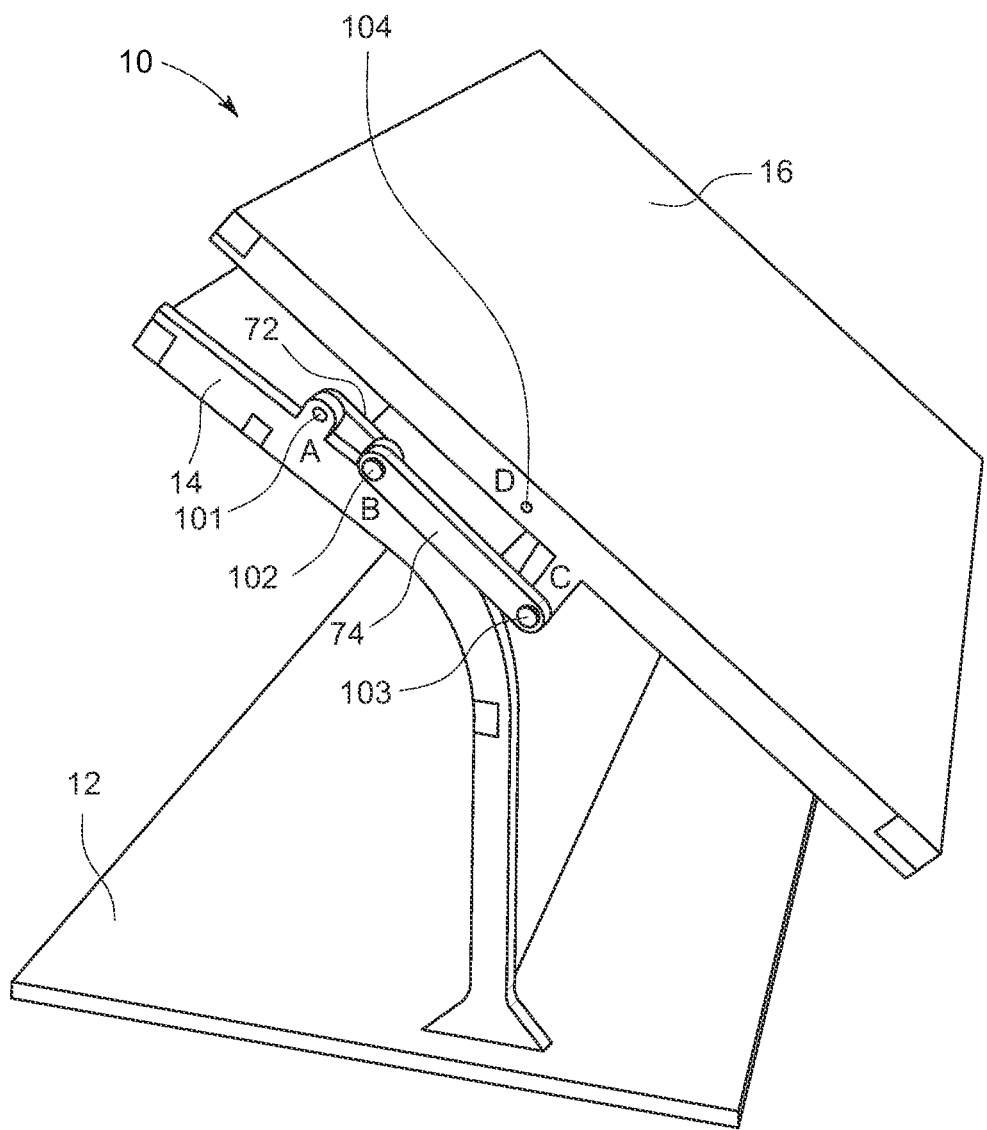
FIGS. 3-6 are perspective views of the POS system in accordance to embodiments.

FIG. 3 illustrates head unit 16 in its most common usage position, parallel to an upper surface of stand 14. FIG. 3 illustrates the upright with display facing employee use case described above.

Figure 4:
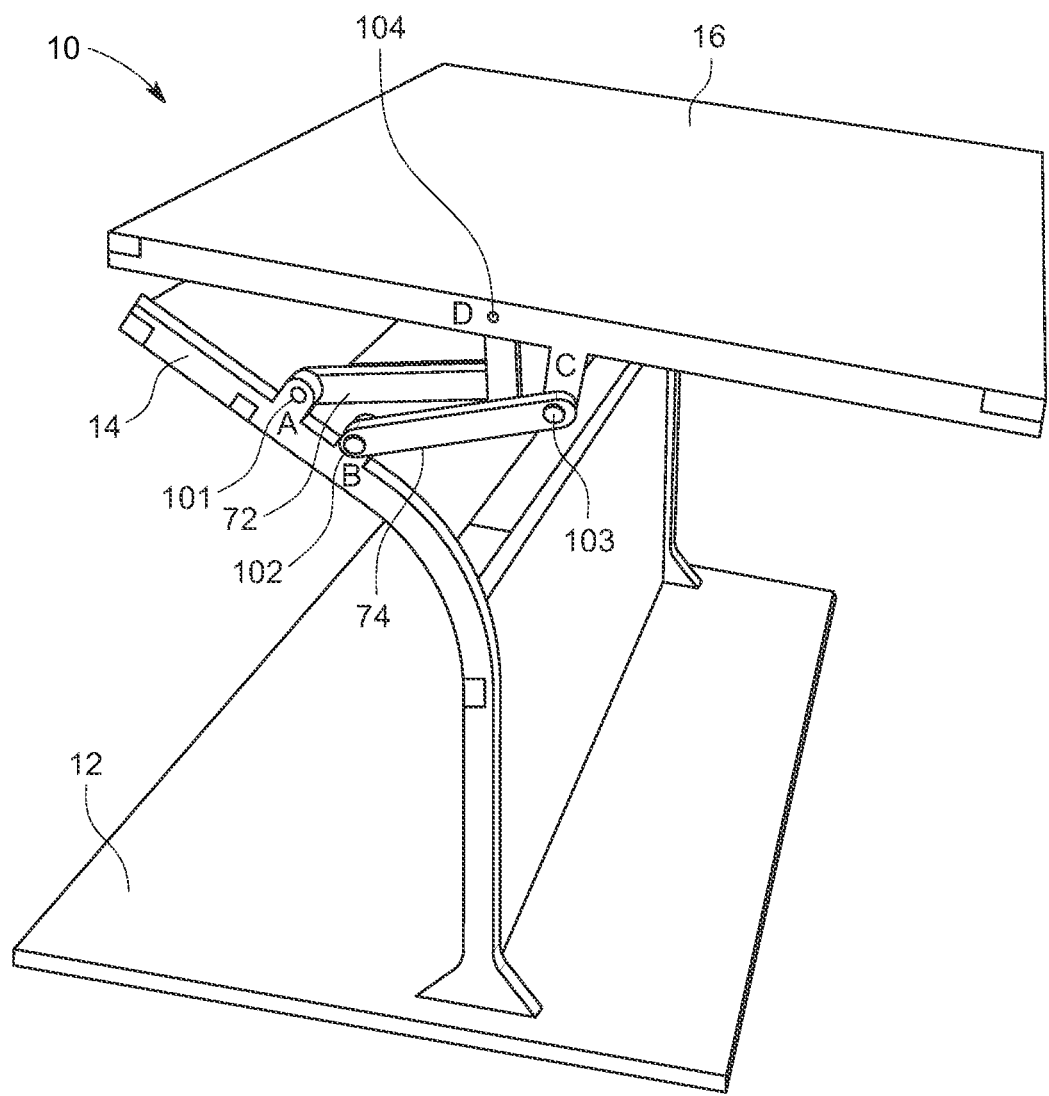

FIG. 4 illustrates that as head unit 16 is moved upward, the inner and outer hinges pivot around pivot points 101 and 102 respectively. Head unit 16 also begins pivoting around points 103 and 104. The two offset pivot locations 103 and 104 prevent head unit 16 from impacting the top edge of stand 14.

Figure 5:
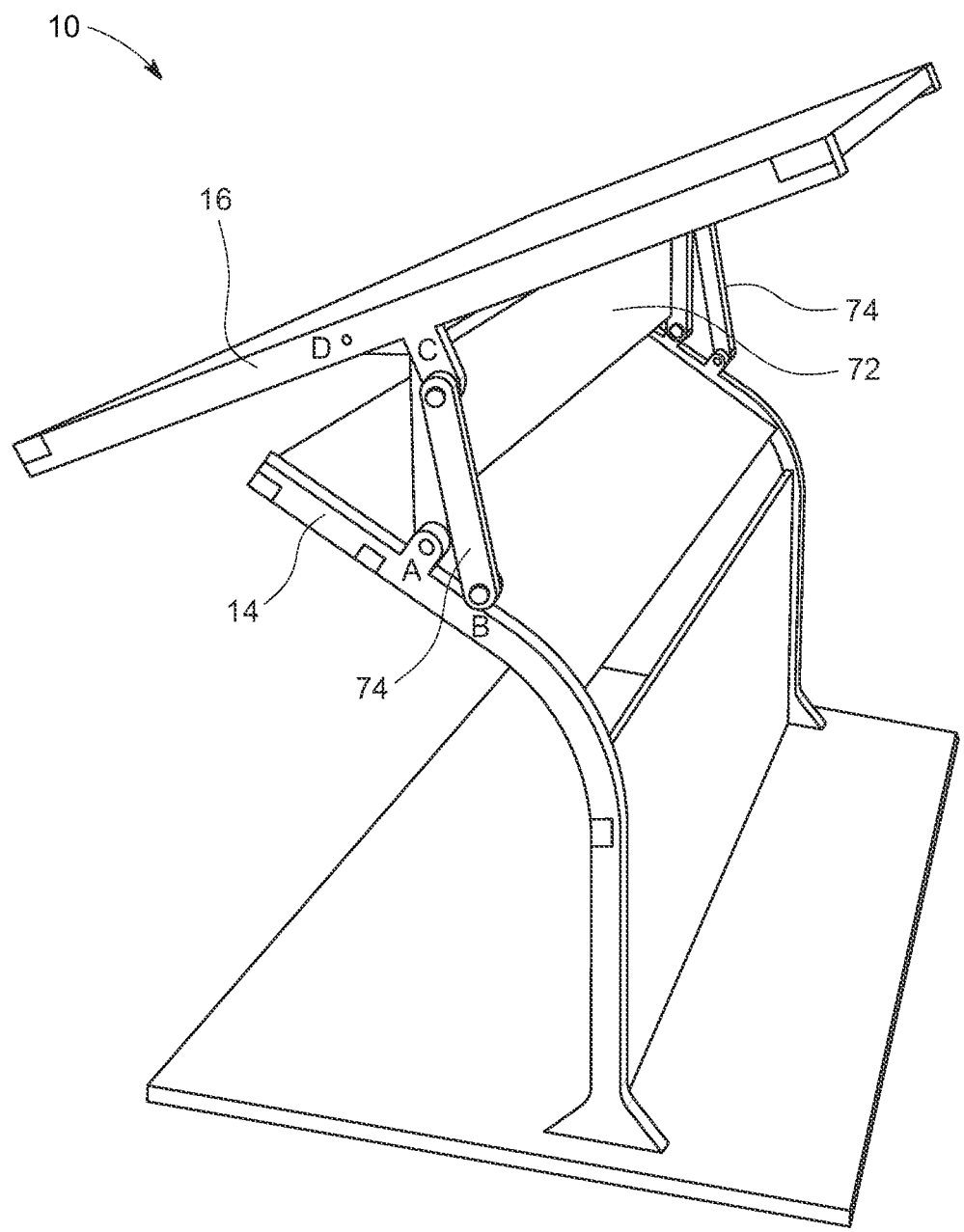

FIG. 5 illustrates that as movement continues, head unit 16 is simultaneously rotated and shifted upward on stand 14.

Figure 6:
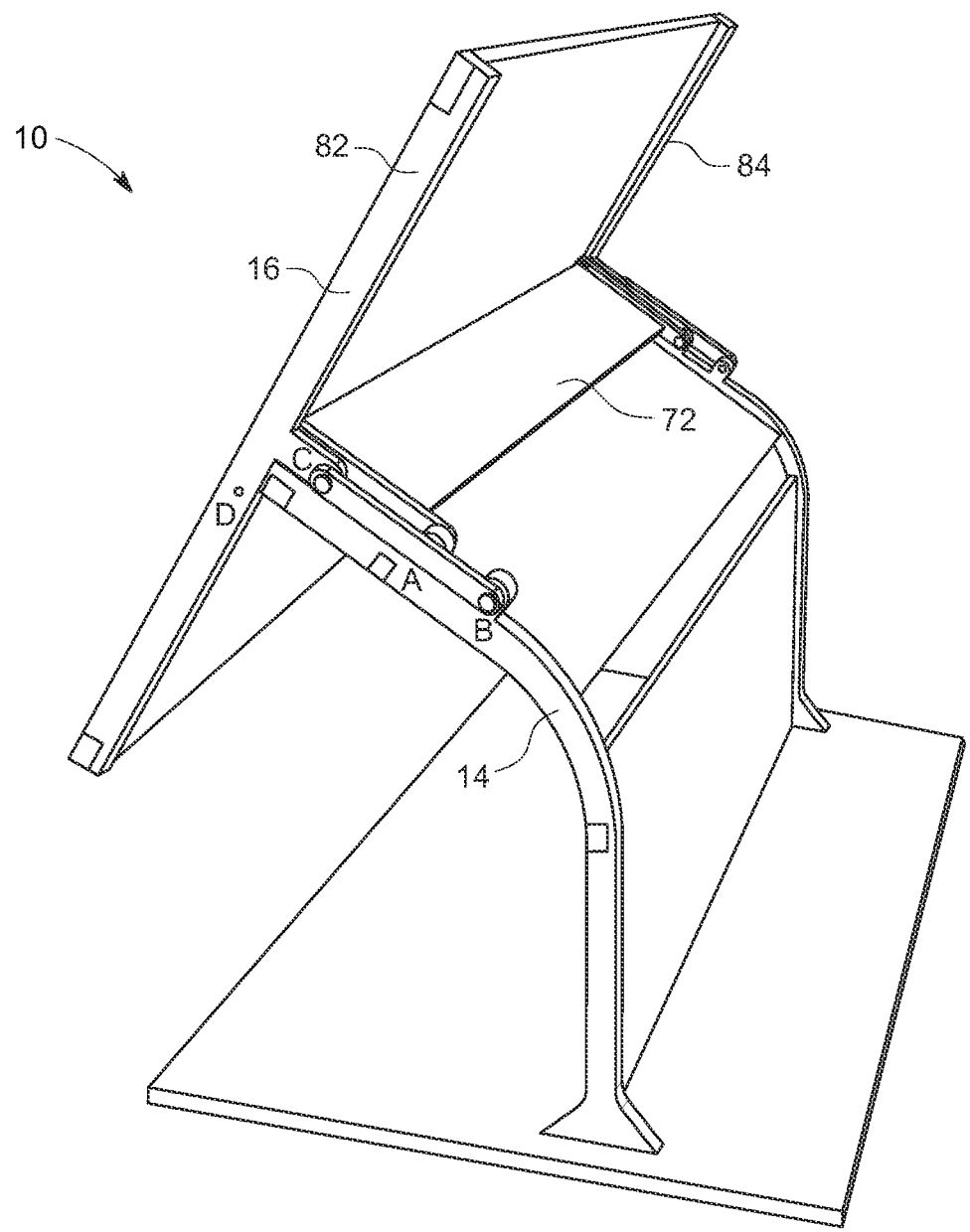

In FIG. 6, head unit 16 is now perpendicular to its original position and the inner and outer hinge arms are 180 degrees from their starting position relative to stand 14. FIG. 6 illustrates the upright with display oriented toward customer use case described above. Inner hinge arm 72, as shown, is one solid structure so that POS system 10 cannot become out of synch on the left or right side, eliminating potential for binding of the movement. Inner hinge arm 72 allows head unit 16 to be rotated via force applied on only one end/side of head unit 16 (e.g., end 82) rather than requiring simultaneous force on both ends (e.g., ends 82 and 84) of head unit 16.

Figure 7:
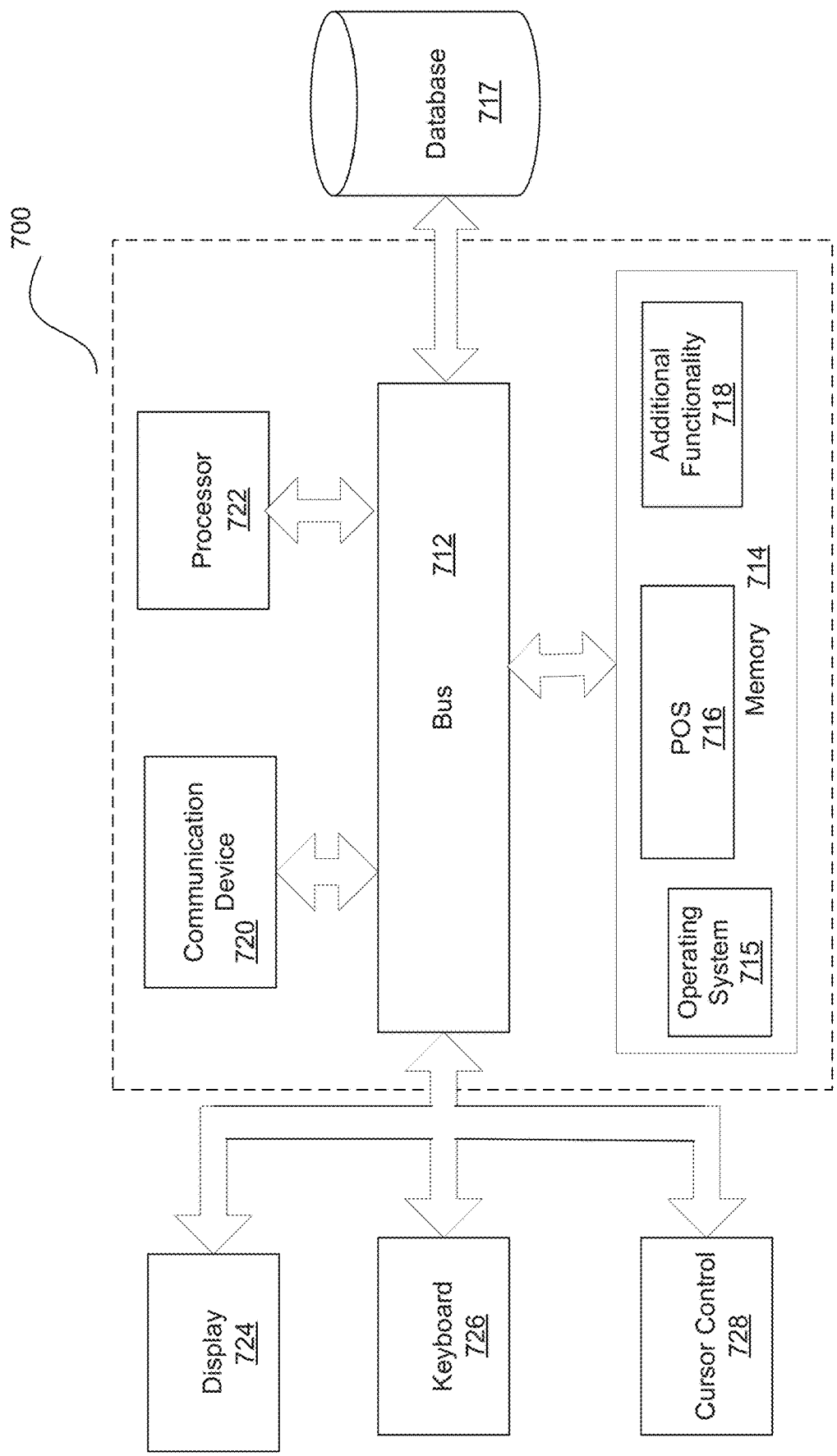
FIG. 7 is a block diagram of a computer server/system in accordance with an embodiment of the invention that implements the head unit.

As disclosed, in embodiments, head unit 16 includes computer software/hardware POS functionality. FIG. 7 is a block diagram of a computer server/system 700 in accordance with an embodiment of the invention that implements head unit 16. Although shown as a single system, the functionality of system 700 can be implemented as a distributed system. Further, the functionality disclosed herein can be implemented on separate servers or devices that may be coupled together over a network. Further, one or more components of system 700 may not be included. For example, when implemented as a web server or cloud based functionality, system 700 is implemented as one or more servers, and user interfaces such as the keyboard, mouse, etc. are not needed. Further, in embodiments system 700 is implemented as a touchscreen based tablet that is integrated into head unit 16 or removably attached to head unit 16

System 700 includes a bus 712 or other communication mechanism for communicating information, and a processor 722 coupled to bus 712 for processing information. Processor 722 may be any type of general or specific purpose processor. System 700 further includes a memory 714 for storing information and instructions to be executed by processor 722. Memory 714 can be comprised of any combination of random access memory ("RAM"), read only memory ("ROM"), static storage such as a magnetic or optical disk, or any other type of computer readable media. System 700 further includes a communication device 720, such as a network interface card, to provide access to a network. Therefore, a user may interface with system 700 directly, or remotely through a network, or any other method.

Computer readable media may be any available media that can be accessed by processor 722 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 722 is further coupled via bus 712 to a display 724. A keyboard 726 and a cursor control device 728, such as a computer mouse or a touchscreen functionality of display 724, are further coupled to bus 712 to enable a user to interface with system 700.

In one embodiment, memory 714 stores software modules that provide functionality when executed by processor 722. The modules include an operating system 715 that provides operating system functionality for system 700. The modules further include a POS module 716 that provides POS functionality, such as the functionality of "Oracle MICROS Simphony Point of Sale", and all other functionality disclosed herein. System 700 can be part of a larger system. Therefore, system 700 can include one or more additional functional modules 718 to include the additional functionality, such as the functionality of a restaurant or hospitality management system or an enterprise resource planning ("ERP") or inventory management system. A database 717 is coupled to bus 712 (either directly or remotely) to provide centralized storage for modules 716 and 718 and store restaurant data, inventory data, transactional data, etc. In one embodiment, database 717 is a relational database management system ("RDBMS") that can use Structured Query Language ("SQL") to manage the stored data. When centralized, database 717 stores data from multiple local or remote POS systems 10 (e.g., multiple POS systems 10 at a single restaurant or geographically dispersed multiple restaurants).

In one embodiment, particularly when there are a large number of restaurants and a large number of POS systems 10, database 717 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 717, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 700 is a computing/data processing system including an application or collection of distributed applications for enterprise organizations, and may also implement logistics, manufacturing, and inventory management functionality. The applications and computing system 700 may be configured to operate with or be implemented as a cloud-based networking system, a software-as-a-service ("SaaS") architecture, or other type of computing solution.

In embodiments, the functionality of POS system 10 via the implementation of POS software such as "Oracle MICROS Simphony Point of Sale", provides real-time information at the fingertips of both customers and employees. For example, ordering is intuitive, kitchen communication is instant, and updates to daily specials, menu details, and personalized promotions are delivered to each touchpoint (i.e., POS system 10) automatically.

In embodiments, POS system 10 communicates with external devices such as smartphones or laptops to provide online ordering for restaurants. The order is placed online via a website or mobile app. The menu can be managed across all channels to accept orders from the mobile app, website and popular marketplaces. Orders are captured by the cloud-based POS system 10 for a single view of transactions and customer interactions. Orders can be sent directly to the kitchen for preparation. Business logic and decision rules can be set to ensure freshness and promised times. Customers and staff can be informed on the order status. Location technology can be used for smart pickup and customer satisfaction.

Embodiments include a conversational ordering screen that allows orders to be taken the way they are spoken without interrupting the customer. It also encourages cross and upselling while providing the flexibility to change orders on the fly. Each employee can be presented with the conversational ordering screen that is best suited for their particular role, environment, or function. For example, cocktail screens for bartenders and full menu screens for table servers can all be fully customizable.

Embodiments provide a friendly and customizable table management screen that improves efficiency and customer service while helping to turn tables and reach revenue goals. It gives servers the ability see the stage of each dining experience and the amount of time guests have been at each table. Embodiments further can deliver service alerts to help staff be more attentive to each guest.

Embodiments further provide a reservation list that allow a hosting staff to manage all reservation requests quickly and easily. If a restaurant uses future reservations or multiple dining room layouts, a tabbed template can provide staff with an easy way to navigate between wait lists, reservation lists, and table layouts. If a table is not immediately available for seating, the guest can add their name to a wait list. The wait list also shows reservations prior to the scheduled arrival, so the wait list and reservations can be managed from one screen. The hosting staff can add, change, and abandon wait requests from this list, and when wait-listed guests are ready to be seated, the name can be dragged and dropped from the wait list to a table.

Embodiments can integrate with a kitchen system such as the "Oracle MICROS Kitchen Display Systems" to increase kitchen efficiency, reduces errors, enhance food quality, and optimize speed of service. Touch screens, bump bars, and remote views can allow a kitchen staff to easily prioritize food preparation and manage timing across multiple kitchen stations. The kitchen display system can help kitchens manage orders from multiple channels, including in-house waitstaff, self-service kiosks, drive-thru, website, mobile ordering apps, and third-party delivery apps.

In embodiments, POS system 10 includes a secure and open application programming interface ("API") to connect to various online ordering platforms, delivery services, mobile payment processing, etc. Further, POS system 10 can integrate and operate with cash drawers, EMV credit card readers, receipt printers, fingerprint scanners, weight scales, barcode scanners, and other peripherals.

Embodiments can include reporting and analytics. Pre-built dashboards provide insights on trends, forecasts, and opportunities from a desktop web browser or a mobile app. Embodiments allow for viewing reports by employee, location, region, restaurant type, or across all locations as a whole. Mobile push notifications provide updates and alerts from any locations.

Embodiments can be integrated with an inventory management system to minimize waste by maintaining optimal stock levels. By using real-time forecasting data, embodiments can optimize order timing. Embodiments can also show what should be on the shelf, helping to prevent over-portioning, waste, and theft.

Embodiments can connect with vendors and suppliers. Embodiments can automatically reorder, access invoices online, spot pricing trends, create menu models, etc.

Embodiments can include tools to keep the customers coming back. Embodiments can manage gifts and awards based on visit frequency, amount spent, and items purchased. Embodiments allow customers to view their reward activity in real time and engage with them through targeted, data-driven marketing campaigns to boost the overall customer satisfaction.

Embodiments help managers schedule shifts using forecasting and employee data, helping restaurants avoid excessive overtime costs and scheduling conflicts. Embodiments also support employees with onboarding, training, and time-off requests to ensure staff is educated, comfortable, and primed to deliver the best service.

Embodiments include menu management to provide updating of menu items across POS devices, digital menu screens, websites, and mobile apps in real time. Ingredients, pricing, and adherence to local regulations can all be managed centrally.

Embodiments include a point of sale system that includes a base, a stand coupled to the base, a head unit coupled to the stand, and two outer hinge arms and an inner hinge arm that couple the head unit to the stand.

Embodiments further include a first pivot point at each end of the stand that couples the outer hinge arms to the stand and a second pivot point at each end of the stand that couples the inner hinge arm to the stand. In embodiments, the first pivot point and the second pivot point allow the two outer hinge arms and the inner hinge arm to rotate through an approximately 180 degree range of motion relative to the stand.

Embodiments further include a third pivot point at each end of the head unit that couples the outer hinge arms to the head unit and a fourth pivot point at each end of the head unit that couples the inner hinge arm to the head unit. In embodiments, the third pivot point and the fourth pivot point allow the head unit to rotate through an approximately 90 degree range of motion relative to the two outer hinge arms and the inner hinge arm. In embodiments, the third pivot point and the fourth pivot point are offset relative to each other to prevent the head unit from contacting the stand while the head unit is being rotated.

In embodiments, the height of the head unit relative to the stand is increased during a rotation. In embodiments, the base is removable and the two outer hinge arms and an inner hinge arm allow for a low profile position when the base is removed and the stand is rotated to contact a surface at two points.

Embodiments further include a processor executing POS software and including a touchscreen. In embodiments, the head unit is in electronic communication with a remote server.

Embodiments include a method of operating a point of sale system including a base, a stand coupled to the base, a head unit coupled to the stand, and two outer hinge arms and an inner hinge arm that couple the head unit to the stand. The method includes rotating the head unit relative to the stand to a first position adapted for an employee of an establishment, the head unit substantially facing the employee and rotating the head unit relative to the stand to a second position adapted for a customer of the establishment, the head unit substantially facing the customer and the head unit at a higher height relative to the first position.

In embodiments, the employee and customer are substantially on opposite sides of the stand. The method further includes removing the base and rotating the stand to contact a surface at two points to form a third position of the head unit.

Embodiments include a point of sale system that includes a base, a stand coupled to the base, a head unit coupled to the stand, means for rotating the head unit relative to the stand to a first position adapted for an employee of an establishment, the head unit substantially facing the employee, and means for rotating the head unit relative to the stand to a second position adapted for a customer of the establishment, the head unit substantially facing the customer and the head unit at a higher height relative to the first position.

As disclosed, embodiments provide a single design that allows for multiple end user configurations. For example a quick service restaurant may have numerous associate driven POS systems with an order taker staffing each one during the lunch rush. After the rush, the restaurant can "flip" POS system 10 to be a self-ordering kiosk to allow for patrons to self-order with very limited staffing. In another example, a casino may have a large line of "check in" systems for the Friday night ingress of weekend casino customers. However, a few super VIPs would prefer a more personal engagement model with a POS system that lays flat on the counter to allow a very personalized engagement, so that the low mode of POS system 10 can be used.

Embodiments utilize a novel two bar hinge mechanism that allows for angular adjustment for the associate facing use case and then the ability to flip over the top for use as a customer facing kiosk.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A point of sale system comprising:
   a base;
   a stand coupled to the base;
   a head unit coupled to the stand;
   two outer hinge arms and an inner hinge arm that couple the head unit to the stand;
   a first pivot point at each end of the stand that couples the outer hinge arms to the stand and a second pivot point at each end of the stand that couples the inner hinge arm to the stand; and
   a third pivot point at each end of the head unit that couples the outer hinge arms to the head unit and a fourth pivot point at each end of the head unit that couples the inner hinge arm to the head unit;
   wherein the inner hinge arm comprises a single structure that is coupled to both of the second pivot points and both of the fourth pivot points.

2. The point of sale system of claim 1, wherein the first pivot points and the second pivot points allow the two outer hinge arms and the inner hinge arm to rotate through an approximately 180 degree range of motion relative to the stand.

3. The point of sale system of claim 1, wherein the third pivot points and the fourth pivot points allow the head unit to rotate through an approximately 90 degree range of motion relative to the two outer hinge arms and the inner hinge arm.

4. The point of sale system of claim 1, wherein the third pivot points and the fourth pivot points are offset relative to each other to prevent the head unit from contacting the stand while the head unit is being rotated.

5. The point of sale system of claim 2, wherein a height of the head unit relative to the stand is increased during a rotation.

6. The point of sale system of claim 1, wherein the base is removable and the two outer hinge arms and the inner hinge arm allow for a low profile position when the base is removed and the stand is rotated to contact a surface at two points.

7. The point of sale system of claim 1, the head unit comprising a processor and executing point of sale software, and comprising a touchscreen.

8. The point of sale system of claim 7, wherein the head unit is in electronic communication with a remote server.

9. A method of operating a point of sale system comprising a base, a stand coupled to the base, a head unit coupled to the stand, and two outer hinge arms and an inner hinge arm that couple the head unit to the stand, the method comprising:
   rotating the head unit relative to the stand to a first position adapted for an employee of an establishment, the head unit substantially facing the employee; and
   rotating the head unit relative to the stand to a second position adapted for a customer of the establishment, the head unit substantially facing the customer and the head unit at a higher height relative to the first position;
   the point of sale system further comprising:
      a first pivot point at each end of the stand that couples the outer hinge arms to the stand and a second pivot point at each end of the stand that couples the inner hinge arm to the stand; and
      a third pivot point at each end of the head unit that couples the outer hinge arms to the head unit and a fourth pivot point at each end of the head unit that couples the inner hinge arm to the head unit;
      wherein the inner hinge arm comprises a single structure that is coupled to both of the second pivot points and both of the fourth pivot points.

10. The method of claim 9, wherein the first pivot points and the second pivot points allow the two outer hinge arms and the inner hinge arm to rotate through an approximately 180 degree range of motion relative to the stand.

11. The method of claim 9, wherein the third pivot points and the fourth pivots point allow the head unit to rotate through an approximately 90 degree range of motion relative to the two outer hinge arms and the inner hinge arm.

12. The method of claim 9, wherein the third pivot points and the fourth pivot points are offset relative to each other to prevent the head unit from contacting the stand while the head unit is being rotated.

13. The method of claim 9, wherein the employee and the customer are substantially on opposite sides of the stand.

14. The method of claim 9, further comprising removing the base rotating the stand to contact a surface at two points to form a third position of the head unit.

15. The method of claim 9, the head unit comprising a processor and executing point of sale POS software, and comprising a touchscreen.

16. A point of sale system comprising:
   a base;
   a stand coupled to the base;
   a head unit coupled to the stand;
   first means for rotating the head unit relative to the stand to a first position adapted for an employee of an establishment, the head unit substantially facing the employee; and
   second means for rotating the head unit relative to the stand to a second position adapted a customer of the establishment, the head unit substantially facing the customer and the head unit at a higher height relative to the first position;
   the first means for rotating and second means for rotating comprising:
      two outer hinge arms and an inner hinge arm that couple the head unit to the stand;
      a first pivot point at each end of the stand that couples the outer hinge arms to the stand and a second pivot point at each end of the stand that couples the inner hinge arm to the stand; and
      a third pivot point at each end of the head unit that couples the outer hinge arms to the head unit and a fourth pivot point at each end of the head unit that couples the inner hinge arm to the head unit;
      wherein the inner hinge arm comprises a single structure that is coupled to both of the second pivot points and both of the fourth pivot points.

17. The point of sale system of claim 16, wherein the first pivot points and the second pivot points allow the two outer hinge arms and the inner hinge arm to rotate through an approximately 180 degree range of motion relative to the stand.

18. The point of sale system of claim 16, wherein the third pivot points and the fourth pivot points allow the head unit to rotate through an approximately 90 degree range of motion relative to the two outer hinge arms and the inner hinge arm.

19. The point of sale system of claim 16, wherein the third pivot points and the fourth pivot points are offset relative to each other to prevent the head unit from contacting the stand while the head unit is being rotated.

20. The point of sale system of claim 16, wherein the base is removable and the two outer hinge arms and the inner hinge arm allow for a low profile position when the base is removed and the stand is rotated to contact a surface at two points.

* * * * *

UNITED STATES PATENT AND TRADEMARK OFFICE
CERTIFICATE OF CORRECTION

| | |
|---|---|
| PATENT NO. | : 11,710,385 B2 |
| APPLICATION NO. | : 17/448268 |
| DATED | : July 25, 2023 |
| INVENTOR(S) | : Nicewick et al. |

It is certified that error appears in the above-identified patent and that said Letters Patent is hereby corrected as shown below:

In the Specification

In Column 4, Line 55, delete "16" and insert -- 16. --, therefor.

In the Claims

In Column 10, Line 25, in Claim 11, delete "pivots point" and insert -- pivot points --, therefor.

In Column 10, Line 38, in Claim 15, delete "sale POS" and insert -- sale --, therefor.

Signed and Sealed this
Twenty-eighth Day of May, 2024

Katherine Kelly Vidal
*Director of the United States Patent and Trademark Office*